United States Patent [19]

Marquis

[11] Patent Number: 5,076,357
[45] Date of Patent: Dec. 31, 1991

[54] METHOD OF ENHANCING RECOVERY OF PETROLEUM FROM AN OIL-BEARING FORMATION

[75] Inventor: David M. Marquis, Lafayette, Calif.

[73] Assignee: Chevron Research & Technology Company, San Francisco, Calif.

[21] Appl. No.: 531,051

[22] Filed: May 31, 1990

[51] Int. Cl.$^5$ .......................................... E21B 43/22
[52] U.S. Cl. .................................. 166/273; 166/268; 166/275; 166/309; 252/8.554
[58] Field of Search ............... 166/268, 273, 274, 275, 166/309; 252/8.554

[56] References Cited

U.S. PATENT DOCUMENTS

| 4,572,294 | 2/1986 | Duerksen et al. | 166/309 X |
| 4,576,232 | 3/1986 | Duerksen et al. | 166/309 X |
| 4,643,256 | 2/1987 | Dilgren et al. | 166/272 X |
| 4,763,730 | 8/1988 | Suzuki | 166/274 X |
| 4,820,429 | 4/1989 | Lim | 166/272 X |
| 4,856,589 | 8/1989 | Kuhlman et al. | 252/8.554 X |
| 4,860,828 | 8/1989 | Oswald et al. | 166/275 X |
| 4,911,238 | 3/1990 | Lau et al. | 166/275 X |

Primary Examiner—George A. Suchfield
Attorney, Agent, or Firm—Burns, Doane, Swecker & Mathis

[57] ABSTRACT

A method for enhancing the recovery of petroleum from an oil bearing formation during injection of a non-condensible gas comprises the at least periodic injection of a foam forming composition or a preformed foam into the reservoir. The foam comprises a mixture of a non-condensible gas, preferably $CO_2$, water and an alpha-olefin sulfonate. The alpha-olefin sulfonate comprises a mixture of hydroxy-sulfonates and alkene-sulfonates wherein the ratio of alkene-sulfonates to hydroxy-sulfonates is preferably not greater than about 4. In addition, the hydroxy-sulfonates comprises 3-hydroxy and 4-hydroxy-sulfonates wherein the ratio of 3-hydroxy-sulfonates to 4-hydroxy-sulfonates is at least about 2. The method is preferably employed within a light oil bearing formation comprising sandstone.

52 Claims, 1 Drawing Sheet

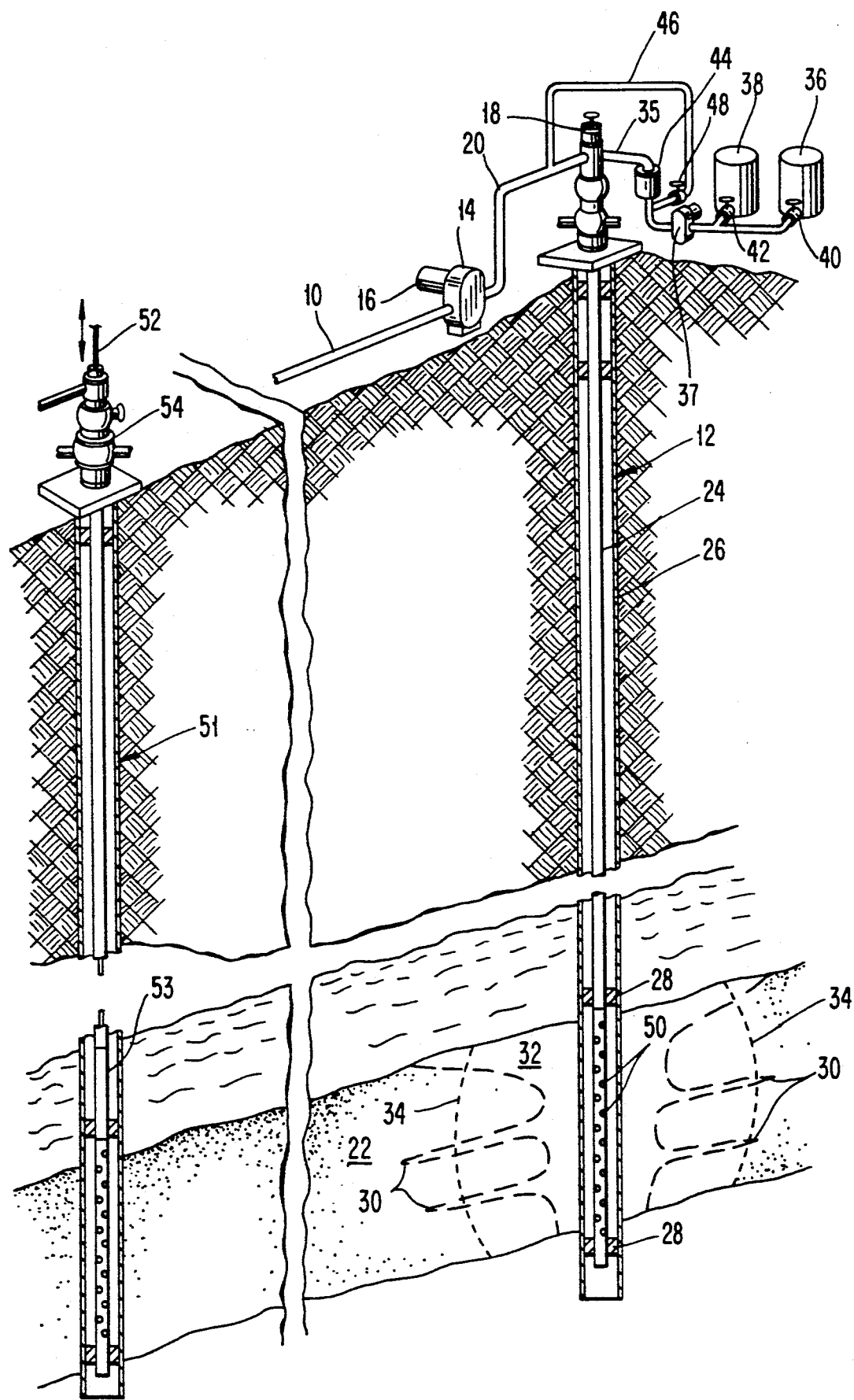

METHOD OF ENHANCING RECOVERY OF PETROLEUM FROM AN OIL-BEARING FORMATION

BACKGROUND OF THE INVENTION

The present invention relates to a method of enhancing recovery of petroleum from an oil bearing formation.

In the recovery of light oils (i.e., greater than 20° API) from reservoirs, particularly deep, high pressure reservoirs which are composed of sandstone, the use of primary production techniques (i.e., use of only the initial formation energy to recover the crude oil), followed by the secondary technique of water flooding, recovers only about 60 to 70% of the original oil present in the formation.

Moreover, the use of certain enhanced oil recovery (EOR) techniques is also known within the art. These techniques can be generally classified as either a thermally based recovery method, i.e., utilizing steam, or a gas-drive method that can be operated under either miscible or non-miscible conditions.

The gases which are commonly employed in gas-drive methods are those normally referred to as non-condensible gases, for example, nitrogen, carbon dioxide, methane, mixtures of methane with ethane, propane, butane, and higher hydrocarbon homologues.

Although the viscosity of these lighter oils is comparable to that of water, the use of steam-based EOR techniques is usually not found to be practical or economical because these types of oil are found at depths requiring pressures greater than 1000 psi to force the oil to flow. For this reason, the art has primarily focused upon the gas-drive methods employing noncondensible gases such as hydrocarbons, $N_2$ or $CO_2$ in this environment.

For a given crude oil and temperature, the non-condensible gases become miscible with the oil above a pressure known as the minimum miscibility pressure. Above this pressure, these "noncondensible" gases attain a supercritical state wherein their behavior has characteristics of both gases and liquids.

With those enhanced recovery processes which employ noncondensible gases under miscible conditions, the oil can be caused to flow toward a producing well because the noncondensible gas "swells" the oil (i.e., increases the volume by dissolving in the oil) and, thus, reduces the viscosity of the oil.

The method of the present invention is preferably directed to this miscible operation although it is equally effective under non-miscible conditions.

A typical procedure involves injecting a slug of $CO_2$ followed by the injection of a higher viscosity fluid such as water to "push" the $CO_2$. See, for example, the discussion in U.S. Pat. No. 2,623,596. Moreover, U.S. Pat. No. 3,065,790 indicates that this process may be more cost effectively employed if a relatively small slug of $CO_2$ is injected ahead of a drive fluid. In fact, as illustrated by U.S. Pat. No. 3,529,668, this type of recovery procedure is typically performed in "water alternating gas (WAG)" cycles.

Because of the viscosity and density differences between the $CO_2$ and the light oil (i.e., $CO_2$ has only 5 to 10% of the viscosity of the light oil), the $CO_2$ tends to bypass much of the oil when flowing through the pores of the rock reservoir.

One proposed solution to this problem associated with the bypassing of the $CO_2$ has been through the use of a small amount of water which contains a surfactant, with the $CO_2$. In particular, a surfactant has been proposed as a means for generating a foam or an emulsion in the formation. See, for example, U.S. Pat. No. 4,380,266 to Wellington and U.S. Pat. No. 5,502,538 to Wellington et al. Each of these foams or emulsions is composed of a non-condensible gas, such as $CO_2$, and water which contains a surfactant.

The purpose of this foam is to inhibit the flow of the $CO_2$ into that portion of the formation containing only residual oil saturation. In addition, the foam physically blocks the volumes through which $CO_2$ is short-cutting. This forces the $CO_2$ to drive the recoverable hydrocarbons from the less depleted portions of the reservoir toward the production well.

However, as clearly discussed within U.S. Pat. No. 4,380,266, the use of traditional surfactants, such as ethoxy-sulfates (particularly Alipal CD 128 supplied by GAF Corp.), suffers from problems associated with the instability of the foam produced in this environment. In the Society of Petroleum Engineers paper SPE 14394 (Las Vegas, NV, Sept. 22-25, 1985), Borchardt, et. al. summarize evaluation of over 40 surfactants for use in $CO_2$ foam flooding. Neither their studies nor the extensive literature cited mentions use of alpha olefin sulfonates (AOS). Thus, while certain surfactants have been suggested for use in this manner, the art has been largely unable to provide a foam-forming composition which is effective in providing a stable foam in this environment.

In particular, when using an non-condensible gas under miscible conditions, the creation of an effective foam is very difficult because either the salt concentration of the water in the formation (connate or injected as brine), the residual oil in the reservoir, or the chemical instability of surfactants tend to break the foam or even prevent the foam from forming.

The class of surfactants, known as alpha-olefin sulfonate (AOS) surfactants, is also recognized in the art. See, for example, U.S. Pat. No. 3,332,880 to Kessler et al. These surfactants have been typically employed in detergent compositions for dishwashing and laundering. Such AOS compositions are typically a generic mixture of components such as hydroxy-sulfonates, alkene-sulfonates and alkene-disulfonates and the relation of foam performance to composition has focussed on detergency and dishwashing. This patent specifically claims 4 hydroxy-n-hexadecyl -1- sulfonate as a superior cleaning agent in hot water household laundry use. A companion filing, U.S. Pat. No. 3,488,384 describes processes for preparation of AOS for the generic composition described above.

The art has utilized certain AOS compounds in the thermal steam drive recovery techniques previously discussed. See, for example, U.S. Pat. No. 4,393,937 to Dilgren et al which discusses a steam foam-forming composition which includes AOS compositions. This patent discloses that for steam drive processes, the specific composition of the AOS surfactants employed is not a critical factor.

The use of AOS compositions in steam drive techniques is also illustrated by U.S. Pat. No. 4,532,993 to Dilgren et al. The AOS composition employed within this patent was chosen so as to provide a foam which will collapse in the presence of oil.

It has also been recognized that the relative proportions of the components of the AOS can be varied depending upon the process conditions employed in production of the AOS. For example, it has been recognized that the 3-hydroxy component of the AOS will be minimized and the 4-hydroxy component maximized if the 1-3 sultone intermediate is allowed to age during AOS production and, thus, isomerize into a 1,4-sultone. See, for example, the discussion in Shell Technical Bulletin SC:74-81 by Kubitschek et al.

On the other hand, an AOS composition which has a high concentration of the 3-hydroxy component has been recognized as a possible additive to steam drive foam-forming compositions. See "Analysis of Alpha Olefin Sulfonates Qualitative Carbon-13 NMR" by Gentemkpo, et al., Shell Development Co., 1985.

The possible use of a high molecular weight AOS within a steam drive environment is not particularly surprising because the requirements for effective foaming in steam are related to solubility and foaming ability at high temperatures (i.e., 300 to 600° F. and pressures of 100 to 500 psi). The AOS used in liquid household dishwashing liquid detergents is based on $C_{14}$-$C_{16}$ alpha olefins because testing shows this molecular weight range AOS gives optimum foaming at 100-120° F., the temperature range for hand dishwashing.

The requirements are substantially different for miscible gas flooding systems, i.e., these systems utilize temperatures below 200° F. and pressures greater than about 1200 psi for $CO_2$ and up to about 5000 psi for nitrogen.

Another problem with the use of non-condensible gases such as $CO_2$ within sandstone reservoirs is the undesirable and uneconomically high adsorption of surfactant onto the sandstone. This is a particular problem with respect to systems which employ non-condensible gases such as $CO_2$ when compared to steam drive methods, due to the fact that adsorption occurs at much lower levels in the higher temperature environment associated with steam as compared to the relatively low temperatures normally encountered in light oil reservoirs. In other words, adsorption increases as the temperature is lowered.

Thus, the need still exists for a foam forming composition which is effective in providing a stable foam, particularly for use with non-condensible gases such as $CO_2$ in the removal of light oils from sandstone reservoirs.

Accordingly, it is an object of the present invention to provide an effective method for enhancing recovery of petroleum from oil bearing formations.

It is a further object to provide a foam which can be effectively employed with a non-condensible gas such as CO2 in a method of enhanced recovery of light oil from a reservoir.

These and further objects will become apparent from the specifications and claims which follow.

SUMMARY OF THE INVENTION

In accordance with the foregoing objectives, the present invention relates to a method for enhancing the recovery of petroleum. In particular, the present invention relates to a method for enhancing recovery of petroleum from an oil bearing formation during injection of a non-condensible gas comprising at least periodically injecting a preformed foam comprising a foam forming composition and the non-condensible gas into the formation.

In another aspect, the present invention relates to a method for enhancing recovery of petroleum from an oil bearing formation during injection of a non-condensible gas comprising at least periodically injection of the foam-forming composition into the oil bearing formation.

The foam forming composition employed in the present invention comprises a mixture of alpha olefin sulfonate (AOS) and water wherein the AOS is present in an amount effective to form a stable foam upon mixing of the foam forming composition with water and a non-condensible gas such as $CO_2$.

The AOS comprises a mixture of hydroxy-and alkene-sulfonates where, preferably, the ratio of alkene- to hydroxy- sulfonates is not greater than about 4.

In addition, the hydroxy-sulfonates comprise both 3-hydroxy and 4-hydroxy-sulfonates. In one aspect of the AOS composition employed in the present invention, the ratio of 3-hydroxy to 4-hydroxy-sulfonates is at least about 2. In another aspect of t present invention the 3-hydroxy-sulfonates are present in amount of at least about 20% by weight.

BRIEF DESCRIPTION OF THE DRAWINGS

The FIGURE illustrates a system in which the process of the present invention can be employed.

DETAILED DESCRIPTION OF THE PREFERRED EMBODIMENTS

The present invention relates to a method for enhancing recovery of petroleum from oil-bearing formations. The method utilizes a foam-forming composition which can be employed with a non-condensible gas. This foam forming composition comprises a mixture of an AOS and water. The AOS employed in the present invention has about 8 to 18 carbon atoms with about 8 to 14 carbon atoms being preferred and about 12 to about 14 being most preferred.

The AOS also includes both hydroxy-sulfonates and alkene-sulfonates. The hydroxy sulfonates include both 3-hydroxy and 4-hydroxy sulfonates while the alkene-sulfonates include alkene-1-sulfonates (alkene-1), alkene-2-sulfonates (alkene-2), alkene-3-sulfonates (alkene-3), alkene-4-sulfonates (alkene-4), alkene-5-sulfonates (alkene-5), alkene-6-sulfonates (alkene-6), alkene-7-sulfonates (alkene-7) and alkene-8-sulfonates (alkene-8).

Alkene- disulfonates can also be present in the AOS, however, current art-recognized methods of making AOS compositions are effective in minimizing the disulfonate formation by the choice of equipment employed as well as control of processing conditions.

One or both of the following relationships relate to the AOS employed in the present invention.

(1) The 3-hydroxy sulfonates are present in an amount effective in providing a foam of increased stability. This amount is preferably at least about 20% by weight of the AOS.

(2) The ratio of the 3-hydroxy to the 4-hydroxy sulfonates can also be provided which is sufficient to provide the foam having increases stability., This ratio is preferably greater than about 3, most preferably about 4 to about 6.

The hydroxy-sulfonates are preferably present in the AOS in an amount at least about 20 percent by weight. In other words, the ratio of alkene-sulfonate to hydroxy-sulfonate is, preferably, not greater than about 4.

In a more preferred embodiment of the present invention, the ratio of alkene-1 (1-ene) and alkene-2 (2-ene) to alkene-3+(3+-ene) is at least about 2. By "alkene 3+"

it is meant the combination of alkene-3, alkene-4, alkene-5, alkene-6, alkene-7 and alkene-8.

The foam forming composition employed in the present invention comprises a mixture of the AOS with water where the AOS is present in the amount effective to form a foam upon mixing of the foam forming composition with a non-condensible gas.

The foam forming composition is preferably formed as a concentrate comprising an admixture of the AOS composition and water, where the AOS is present in an amount of about 40% by weight. In use, the concentrate is diluted with water.

The foam produced in the present invention is not greater than about 40 volume percent liquid phase. In other words, it is at least about 60% quality foam. In addition, the AOS is preferably present in the liquid phase of the foam in an amount of about 0.1 to about 1 percent by weight.

The foam-forming composition used in the present invention may also optionally contain minor amounts of other surface active agents. For example, amphoteric surfactants may be present in amounts less than about 5% by weight of the diluted composition. In addition, AOS dimers may be present in an amount preferably less than about 0.5% by weight and chelating agents, such as scale inhibitors, may be present in an amount preferably less than about 0.05% by weight. The total amount of these additional surface active agents is preferably less than about 5% by weight of the dilute solution.

A preferred AOS composition according to the present invention has the following characteristics:

| Characteristic | Preferred Value |
|---|---|
| Active Content Wt % | 40 ± 2 |
| Unsulfonated Oil Wt %, based on Active | 2 max. |
| pH, 5% Solution | 8-10 |
| Total Hydroxysulfonate, Wt % | 20 min. |
| Ratio 3- to 4- Hydroxy | 2 min. |
| Ratio (1 + 2 -ene) to 3 + -ene | 2 min. |

The AOS composition employed within the present invention can be formed by any of the methods recognized in the art of producing a predominantly 3-hydroxy sulfonate mixture. See, for example, U.S. Pat. No. 3,488,384 and the Shell Technical Bulletin SC:74–81 which ar incorporated herein by reference.

The water which can be effectively employed within the present invention (in both forming and diluting the concentrate) can include water from any natural source, including a brine ranging in concentration of dissolved solids up to about 18% by weight.

If a brine is employed within the composition of the present invention, the molecular weight of the AOS should be chosen based upon the brine concentration. A manner for making this determination is set forth in U.S. Pat. No. 4,763,730 to Suzuki which is incorporated herein by reference.

The non-condensible gas which can be employed includes carbon dioxide, nitrogen, methane, either alone or mixtures of hydrocarbons such as methane with any of ethane, propane, or butane, flue gas and the like. However, carbon dioxide is preferred. As was previously discussed, although these gases are referred to in the art as non-condensible, it is well known in the art that, in use, these gases are injected into the well formation under supercritical conditions.

In using the foam forming composition for the enhanced recovery of petroleum products, the foam may either be preformed outside of the well or "in situ" (i.e., in the formation). In either method, any of the procedures known in the art for providing a foam into the formation may be employed.

In a preferred embodiment, a preformed foam is at least periodically injected into the formation. Desirably, the foam is preformed in the well tubing or formed on the surface, before the mix reaches the well. Most preferably, such foam is preformed by introducing the foam forming composition and water into a stream of the gas flowing into the reservoir through the gas injection well tubing. This assures foam production before injection into the producing formation.

A source of gas is supplied at a relatively high pressure (which is below the fracturing pressure of the reservoir formation) to an injection well. In practice, this may be a central well flowing radially outward to a group of producing wells surrounding the injection well. Alternatively, the injection well may be one of the several in a line capable of creating a front for a line-drive of oil through the formation from one or a line of producing wells.

In the FIGURE, a single injection well and a single producing well are illustrative of a system which can utilize the present invention. However, a multiple source of gas flowing in a pipeline supplies a non-condensible gas through the injection well 12. For illustrative purposes, a compressor 14 driving by a motor 16 supplies the gas at a desirable pressure to well 12 through the well head 18 and injection pipe 20. The gas is conducted to the desired reservoir rock, such as earth formation 22, through an injection pipe string 24 within casing 26. Injection string 24 may be isolated within well bore 12 in casing 26 by packers 28 above and below formation 22.

As indicated above, the permeability of nearly all sedimentary earth formations that form a petroleum reservoir, such as 22, are inherently inhomogeneous to flow of connate fluids (i.e., water, oil and gas). Each of these fluids tends to flow selectively in permeable channels that have the least resistance to their flow. The resistance to flow of each fluid primarily depends on its viscosity either alone or relative to the other fluids and the capillary forces due to the pore size distribution of the rock. Typically, the resulting rock permeability for flow of each fluid is different in each formation.

Since gases are more mobile than either oil or water, or their mixtures, injected gas in general tends to flow through more permeable gas channels or "fingers" 30 of formation 22 as indicated by dash lines. This gas flow tends to by-pass "tighter" or less-permeable zones wherein the oil-permeable passages are smaller or the oil is more tightly bound to the surface of the rock. In particular, the oil may be in contact with, or partially bound to, clay or shale material that over- or under-lies the reservoir or are within the sandstone rocks of the formation that form the permeable and entrapping oil channels of the reservoir. Thus, "fingering" as indicated by area 32 at the top of formation 22, generally develop so that large portions of the liquid oil are not contacted by the injected gas. As a result, gas may flow predominantly through the lower-resistance paths, gas channels 30 and 32, even where such paths include substantial volumes of movable oil and connate water around such paths. It is accordingly important to form a stable foam in these channels without permanently blocking or decreasing the mobility of substantial volumes of such entrapped oils. Thus, it is possible with the foams formed by the composition of the present invention to maintain the desired injection profile for the drive gas to produce a piston-like movement of oil through the formation, as indicated generally by dotted line 34.

To correct the distortion of the injection profile to approximate front 34, foam forming components of this invention are added to the injected gas stream through injection line 35. For this purpose, surfactant and water or brine are supplied by tanks 36 and 38 through valves 40 and 42, respectively, by metering pump 37 to foam generator 44 and then to injection line 35. Foam may be supplied to the formation by forming it in generator 44 with gas before injection into well head 18. For this purpose, a portion of the injection gas flows from line 20 to generator 44 through line 46 under control of valve 48 to develop the desired foam quality. Foam may also be formed in injection line 24 before contact with formation fluids, as by flow of surfactant solution and gas through perforations 50 in the lower end of tubing 24. Foam so generated upon injection into the reservoir preferentially flows to gas-permeable channels 30, 32. It effectively plugs them so that gas is then diverted to oil-rich portions of the formation. As indicated, the non-condensible gas is thus made to move in a relatively piston-like manner to displace reservoir fluids.

In the present illustration, oil is produced from an adjacent producing well such as 51, by pump 53 operating through sucker rods 52 through well head 54. The surfactant composition prepared in accordance with the present invention is preferably supplied as a concentrated liquid which is then diluted with injection brine. The solution is then pumped from tanks 36 and 38, and metered by pump 37 through line 35 at a desired rate to contact gas flowing in well head 18 or injection string 24.

EXAMPLES

The following examples set forth the advantages that can be associated with the present invention and are to be understood to be illustrative and in nowise limitive.

Example 1 illustrates four steps which can be used to evaluate candidate surfactants for use in miscible flooding as mobility control agents. In step A, surfactants are screened for their solubility in the brine available for injection into the reservoir being evaluated, and foam stability in the presence of stock tank oil from the reservoir. Stock tank oil is the liquid remaining from oil produced from an oil-bearing formation after the dissolved gases have been removed at surface ambient conditions. This screening is done with a simple "bench foam test" that can readily identify surfactants that form stable foams under these conditions.

Step B further evaluates the ability of surfactants to foam in the presence of varying amounts of oil under steady state flow conditions in a simulated porous medium.

Steps A and B are relatively inexpensive and rapid methods for narrowing down a slate of candidates to those worthy of evaluation in the more complex tests that simulate conditions in the oil-bearing reservoir.

Step C is a coreflood test conducted at reservoir temperature and pressure with flow rates approximating those used in the field. For surfactants to be used in sandstone formations standard Berea cores of defined porosity and permeability are commonly used. In cases where they are available, actual field cores are used, as in this Example. Corefloods are multi-step operations designed to reproduce the state of the core as it was in its natural state, i.e., oil and water contents in the void spaces at reservoir temperature and pressure. The ability of foam to control gas mobility can then be measured under realistic conditions for extrapolation to field results in terms of gas utilization efficiency and added oil recovery, using mathematical modeling techniques commonly known as reservoir simulation.

Step D is a determinant of the economic viability of a foam process-measurement of the loss of surfactant to the reservoir rock by several retention mechanisms loosely looped together in the term adsorption. Surfactant adsorbed on reservoir is unavailable for foam generation, and thus can represent a major cost if adsorption is too high.

From the above description, it can be seen that choice of surfactant for gas mobility control is based on a number of factors that can be evaluated experimentally through a series of increasingly complex and costly procedures.

TABLE 1

| | Isomer Distribution in AOS | | |
|---|---|---|---|
| | A C12AOS Comparative | B C12AOS of Invention | C C14AOS of Invention |
| Hydroxy Sulfonate | | | |
| 3- | 10 | 20–24 | 22 |
| 4- | 14 | 6–3 | 5 |
| TOTAL | 24 | 23–30 | 27 |
| Alkene sulfonate | | | |
| 1- | 14 | 19 | 18 |
| 2- | 28 | 33 | 30 |
| 3- | 23 | 11 | 11 |
| >4- | 11 | 11 | 14 |
| TOTAL | 76 | 74 | 73 |

Step A—Bench Foam Test

As an initial test to evaluate the suitability of a surfactant for use as a miscible gas diverting or mobility control, it is first rated for its ability to foam in the injection brine and in the presence of the stock tank oil obtained from the reservoir. The test is conducted by first placing one part of surfactant active ingredient, 8 parts of oil, and 200 parts of brine in a stoppered, graduated cylinder. The cylinder is then shaken vigorously for 5 seconds and the foam is allowed to collapse completely. The procedure is repeated and the new initial foam height is measured. The foam height is again recorded after 5 minutes.

This example employs the AOS compositions which are illustrated in Table 1 as well as $C_8$ AOS, $C_{10}$ AOS, $C_{16}$ AOS, Alipal CO-128 and NEC-25, with the results from these surfactants being shown in Table 2.

TABLE 2

| SURFACTANT | RELATIVE FOAM HEIGHT AFTER 5 MINUTES |
|---|---|
| C8 AOS | 0 |
| C10 AOS | 0 |
| C12 AOS [A] | 69 |
| C12 AOS [B] | 72 |

TABLE 2-continued

| SURFACTANT | RELATIVE FOAM HEIGHT AFTER 5 MINUTES |
|---|---|
| C14 AOS [C] | 15 |
| C16 | 0 |
| ALIPAL CD-128 [ethoxy sulfate] | 80 |
| NES-25 [ethoxy sulfonate] | 93 |

These results indicate the ability to provide foam through the use of an AOS surfactant. As previously discussed, the use of a brine in this example affects the production of foam in the manner discussed within U.S. Pat. No. 4,763,730 to Suzuki.

In particular, the brine used in this example had the composition shown in Table A of Suzuki (U.S. Pat. No. 4,763,730). The presence of strontium and barium in addition to the usual hardness ions, calcium and magnesium in amounts sufficient to precipitate out the $C_{16}$ AOS is still not high enough to make $C_8$ and $C_{10}$ AOS surface active, i.e., their salts with the aforementioned hardness ions are too soluble in the brine to show surface activity. The $C_{14}$ AOS is not soluble enough to show much surface activity either. Thus, this test shows a sharp optimum in AOS molecular weight at $C_{12}$. The other two surfactants were chosen for their known brine tolerance.

Alipal CD-128, an alcohol ethoxy sulfate marketed by GAF Corp. has been widely cited in literature and patents as an ideal surfactant for $CO_2$ flooding. The NES-25 is an alcohol ethoxy sulfonate, marketed by Diamond-Shamrock of the type recently proposed as an improvement over Alipal CD128 for $CO_2$ flooding because it has better hydrolytic stability. At the reservoir conditions where $CO_2$ under high pressure is dissolved in connate water, the pH of the water is 3-4. Under these acidity conditions, sulfates are quite readily hydrolyzed and lose their surface active properties. Sulfonates, in contrast, are very stable at low pH at the relatively low temperatures (below 200.F) normally encountered in light oil reservoirs, by virtue of the carbon-sulfur bond compared to the oxygen-sulfur bond in sulfates.

Step B—Flow test

Surfactants selected from the bench foam test were then subjected to a flow test which evaluates the foam stability in the presence of flowing oil. The apparatus used consisted of a glass bead pack: a 0.375 × 4 inch tightly packed cylinder of 100-200 mesh glass beads in a stainless steel tube. Systems for metering brine, oil, and the gas to be used for miscible oil displacement were piped in parallel for simultaneous injection of fluids into the glass bead pack. A back pressure control device was used to control the system pressure.

In each series of runs, the gas mobility was first measured in the presence of flowing brine. A mixture of brine containing 0.5% weight surfactant with gas in the same proportions as in the control run is then passed through the glass bead pack and the gas mobility measured again. With this mixture continuing to flow at the same rate, oil is added in the amounts successively of 5, 20, and 60% of the total flow, measured at the conditions used. Measurements were normally made using $CO_2$ at an outlet pressure of 300 psig, and a fluid velocity of 900 ft/day using injection brine and stock tank oil from an oil field in the Intermountain West. Results are shown in Table 3.

TABLE 3

| SURFACTANT | $CO_2$ MOBILITY, md/cp | | |
|---|---|---|---|
| | NO OIL | 5% OIL | 25% OIL |
| C12 AOS [A] | 320 | 860 | 770 |
| C12 AOS [B] | 300 | 430 | 420 |
| NES-25 | 320 | 800 | 925 |
| ALIPAL CD-128 | 280 | 820 | 1200 |

The mobility of $CO_2$-brine alone is about 20,000 milidarcies/centipoise (md/cp). Thus, all of these surfactants are highly effective in reducing $CO_2$ mobility in this test. Accordingly, this test does not clearly distinguish among surfactants.

Step C—Core Flood Test

This test is designed to determine the effectiveness of foam in controlling $CO_2$ mobility in a sandstone core at reservoir conditions with residual oil present. This is done by measuring the resistance to flow of foam relative to the flow of $CO_2$ alone. A $CO_2$ foam resistance factor (R) is defined as:

$$R = \frac{dP \text{ using } CO_2 \text{ foam}}{dp \text{ using } CO_2 \text{ alone}}$$

where dP is the pressure drop over the length of the core measured at the same frontal advance rate. The reservoir conditions used in this example were 2800 psig inlet pressure and 160° F. Component flow rates were set so that at reservoir conditions the $CO_2$ foam consisted of 80 volume percent $CO_2$ and 20% brine [80% quality foam]. The surfactant concentration in the brine was 0.5 wt %.

Description of the procedure:

The corefloods were conducted using a one inch diameter field core of three inches long. That was potted in a stainless steel sleeve. The core had a brine permeability of about 100 milidarcies. Several surfactants were tested with the core by going through the following sequence of operations:

1. Flush the core with synthetic injection brine.
2. Displace the brine with stock tank oil.
3. Displace the oil with brine to waterflood residual oil saturation.
4. Inject CO2 at a frontal advance rate of 250 ft/day; measure baseline dP.
5. Inject foam at a frontal advance rate of 250 ft/day; measure steady-state dP.
6. Calculate the Resistance Factor using the formula.
7. Clean out core and repeat procedure with next surfactant.

The results for these surfactants are given in Table 4.

TABLE 4

| SURFACTANT | RESISTANCE FACTOR, R |
|---|---|
| C12 AOS [A] | 5 |
| C12 AOS [B] | 59 |
| C14 AOS [C] | 13 |

A much higher resistance factor is obtained with the AOS of the present invention.

Step D—Surfactant Adsorption Test

Using a fresh field core for each of the measurements, surfactant adsorption of the sandstone was measured by a standard recirculation procedure. The results are shown in Table 5.

TABLE 5

| SURFACTANT | ADSORPTION, mg./g. of rock |
|---|---|
| C12 AOS [A] | 0.2 |
| C12 AOS [B] | 0.2 |
| NES-25 | 0.6 |

The results illustrated the lesser degree of adsorption which can be associated with the surfactant employed in the present invention.

The results are even more extraordinary considering that an adsorption level for a surfactant of 1.0 mg/g sandstone rock translates to a loss of about 8000 lbs of surfactant/acre-ft of formation. Accordingly, it is well known that the "economic" limit for adsorption losses is about 0.5 mg/g of rock. Thus, the AOS employed in the present invention has an adsorption level well below this limit while a comparative surfactant, NES-25, does not.

The foregoing Example shows that on the basis of foam performance and adsorption measured at reservoir conditions, in conjunction with data on chemical and thermal stability, the surfactant composition of the present invention can provide clear advantages over materials known in the art for foam diversion in miscible gas flooding.

EXAMPLE 2

Field Test

On the basis of the data from Steps C & D of Example 1, C12 AOS [B] was chosen for field tests in sandstone reservoirs in Colorado and Alberta, Canada. Foam was generated above ground and injected into the formation through the well bore. Indications of foam emplacement in the higher permeability portions of the formation were an increase in wellhead pressure and reduced infectivity of the $CO_2$, that is the rate of injection of $CO_2$ into the formation that is possible with the added resistance to flow due to the foam. If foam were not transported into the formation, there would be no loss of injectivity. If foam went only into the low permeability zones, there would be a relatively small loss of injectivity. In both cases, substantial reduction of $CO_2$ injectivity was observed.

EXAMPLE 3

Field Test

By screening techniques similar to those described above, a C14 AOS of composition as shown in Table I was chosen for a field test in which supercritical nitrogen gas was being used as the displacing fluid in a sandstone reservoir miscible gas flood. Again, foam was generated above ground, and nitrogen injectivity fell as predicted by a reservoir simulation model during the several weeks of foam injection.

As is clearly illustrated by the results presented within the above examples, the AOS of the present invention can provide a foam which has a greatly increased stability when compared with previous AOS compositions.

While the invention is described in terms of various preferred embodiments, the artisan will appreciate that various modifications, substitutes, omissions, and changes may be made without departing from the spirit thereof. Accordingly, it is intended that the scope of the present invention be limited solely by the scope of the following claims including equivalents thereof.

What is claimed is:

1. A method of enhancing recovery of petroleum from an oil bearing formation during injection of a non-condensible gas comprising at least periodically injecting a preformed foam into said oil bearing formation,
    said preformed foam comprises a mixture of said gas, water and an effective foam-forming amount of an alpha olefin sulfonate (AOS), said AOS comprising a mixture of hydroxysulfonates and alkene-sulfonates
    and further wherein the hydroxy-sulfonates comprise 3-hydroxy- and 4-hydroxy-sulfonates with the ratio of 3-hydroxy-sulfonates to 4-hydroxy-sulfonates being at least about 3.
2. The method of claim 1 wherein the ratio of alkene-sulfonates to hydroxy-sulfonates is not greater than about 4.
3. The method of enhancing recovery of petroleum according to claim 2 wherein the AOS has 12 to 14 carbon atoms.
4. The method of enhancing recovery of petroleum according to claim 1 wherein the AOS has 8 to 18 carbon atoms.
5. The method of enhancing recovery of petroleum according to claim 1 wherein the AOS has 8 to 14 carbon atoms.
6. The method of enhancing recovery of petroleum according to claim 1 wherein the ratio of 3-hydroxy to 4-hydroxy is from about 4 to about 6.
7. The method of enhancing recovery of petroleum according to claim 1 wherein the non-condensible gas comprises $CO_2$, $N_2$, methane or mixtures thereof.
8. The method of enhancing recovery of petroleum according to claim 1 wherein the oil bearing formation comprises sandstone.
9. The method of enhancing recovery of petroleum according to claim 1 wherein the water comprises a brine.
10. The method of enhancing recovery of petroleum according to claim 1 wherein the foam further includes at least one additional surface active agent.
11. The method of enhancing recovery of petroleum according to claim 10 wherein the total amount of the at least one additional surface active agent is not greater than about 5 percent by weight.
12. The method of enhancing recovery of petroleum according to claim 10 wherein the at least one additional surface active agent comprises amphoteric surfactants, AOS dimers, chelating agents or mixtures thereof.
13. The method of enhancing recovery of petroleum according to claim 1 wherein the preformed foam is not greater than about 40 volume percent of liquid phase in an amount of about 0.1 to about 1% by weight.
14. The method of enhancing recovery according to claim 1 wherein the alkene-sulfonates include alkene-1sulfonates, alkene-2-sulfonates, alkene-3+-sulfonates, and the ratio of the total amount of alkene-1-sulfonate and alkene-2sulfonates to alkene-3+-sulfonates is at least about 2.
15. A method of enhancing recovery of petroleum from an oil bearing formation during injection of a non-condensible gas comprising at least periodically injecting a preformed foam into said oil bearing formation, said preformed foam comprises a mixture of said gas, water and an effective foam forming amount of an alpha olefin sulfonate (AOS), wherein the AOS comprises a mixture of hydroxysulfonates and alkene-sulfonates and further wherein the hydroxy sulfonates comprise 3-hydroxy-sulfonates which are present in an amount of at least about 20% by weight of the AOS.

16. The method of claim 15 wherein the ratio of alkene-sulfonates to hydroxy-sulfonates is not greater than about 4.

17. The method of enhancing recovery of petroleum according to claim 16 wherein the AOS has 12 to 14 carbon atoms.

18. The method of enhancing recovery of petroleum according to claim 15 wherein the AOS has 8 to 18 carbon atoms.

19. The method of enhancing recovery of petroleum according to claim 15 wherein the AOS has 8 to 14 carbon atoms.

20. The method of enhancing recovery of petroleum according to claim 15 wherein the non-condensible gas comprises $CO_2$, $N_2$, methane, or mixtures thereof.

21. The method of enhancing recovery of petroleum according to claim 15 wherein the preformed foam is not greater than about 40 volume percent of liquid phase and the AOS is present in the liquid phase in an amount about 0.1 to about 1% by weight.

22. The method of enhancing recovery according to claim 15 wherein the water comprises a brine.

23. The method of enhancing recovery according to claim 15 wherein the oil bearing formation comprises sandstone.

24. The method of enhancing recovery according to claim 15 wherein the foam further includes at least one additional surface active agent.

25. The method of enhancing recovery of claim 24 wherein the total amount of the at least one additional surface active agent is not greater than about 5 percent by weight.

26. The method of enhancing recovery according to claim 24 wherein the at least on additional surface active agent comprises amphoteric surfactants, AOS dimers, chelating agents or mixtures thereof.

27. A method of enhancing recovery of petroleum from an oil bearing formation during injection of a non-condensible gas comprising at least periodically injecting a foam forming composition which comprises an alpha olefin sulfonate (AOS) and water, into said oil bearing formation, said foam forming composition including an effective foam-forming amount of said AOS, wherein
the AOS comprises a mixture of hydroxy-sulfonate and alkene-sulfonates and further wherein
the hydroxy-sulfonates comprise 3-hydroxy- and 4-hydroxy-sulfonates with the ratio of 3-hydroxy-sulfonates to 4-hydroxy-sulfonate being at least about 3.

28. The method of claim 27 wherein the ratio of alkene-sulfonate to hydroxy-sulfonates is not greater than about 4.

29. The method of enhancing recovery of petroleum according to claim 28 wherein the AOS has 12 to 14 carbon atoms.

30. The method of enhancing recovery of petroleum according to claim 27 wherein the AOS has 8 to 18 carbon atoms.

31. The method of enhancing recovery of petroleum according to claim 27 wherein the AOS has 8 to 14 carbon atoms.

32. The method of enhancing recovery of petroleum according to claim 27 wherein the ratio of 3-hydroxy-sulfonate to 4-hydroxy-sulfonate is from about 4 to about 6.

33. The method of enhancing recovery of petroleum according to claim 27 wherein the non-condensible gas comprises $CO_2$, $N_2$, a light hydrocarbon or mixtures thereof.

34. The method of enhancing recovery according to claim 27 wherein the oil bearing formation comprises sandstone.

35. The method of enhancing recovery according to claim 27 wherein the water comprises a brine.

36. The method of enhancing recovery according to claim 27 wherein the composition further includes at least one additional surface active agent.

37. The method of enhancing recovery according to claim 36 wherein the total amount of the at least one additional surface active agent is not greater than about 5 percent by weight.

38. The method of enhancing recovery according to claim 36 wherein the at least one additional surface active agent comprises amphoteric surfactants, AOS dimers, chelating agents or mixtures thereof.

39. The method of enhancing recovery of petroleum according to claim 27 wherein foam formed is not greater than about 40 volume percent liquid phase and the AOS is present in the liquid phase in an amount about 0.1 to about 1% by weight.

40. The method of enhancing recovery according to claim 27 wherein the alkene-sulfonates include alkene-1sulfonates, alkene-2-sulfonates, alkene-3+-sulfonates,
and the ratio of the total amount of alkene-1-sulfonate and alkene-2-sulfonates to alkene-3+-sulfonates is at least about 2.

41. A method of enhancing recovery of petroleum from an oil bearing formation during injection of a non-condensible gas comprising at least periodically injecting a foam forming composition comprising an alpha olefin sulfonate (AOS) and water, into said oil bearing formation, said foam forming composition including an effective foam forming amount of said AOS, wherein
the AOS comprises a mixture of hydroxy-sulfonates and alkene-sulfonates and further wherein
the hydroxy-sulfonates comprise 3-hydroxy-sulfonates which are present in an amount of at least about 20% by weight.

42. The method of claim 41 wherein the ratio of alkene-sulfonates to hydroxy-sulfonates not greater than about 4.

43. The method of enhancing recovery of petroleum according to claim 42 wherein the AOS has 12 to 14 carbon atoms.

44. The method of enhancing recovery of petroleum according to claim 41 wherein the AOS has 8 to 18 carbon atoms.

45. The method of enhancing recovery of petroleum according to claim 41 wherein the AOS has 8 to 14 carbon atoms.

46. The method of enhancing recovery of petroleum according to claim 41 wherein the non-condensible gas comprises $CO_2$, $N_2$, methane, or mixtures thereof.

47. The method of enhancing recovery of petroleum according to claim 41 wherein foam formed is not greater than about 40 volume percent liquid phase and the AOS is present in the liquid phase in an amount about 0.1 to about 1% by weight.

48. The method of enhancing recovery according to claim 41 wherein the water comprises a brine.

49. The method enhancing recovery according to claim 41 wherein the oil bearing formation comprises sandstone.

50. The method of enhancing recovery according to claim 41 wherein the composition further includes at least one additional surface active agent.

51. The method of enhancing recovery according to claim 50 wherein the total amount of the at least one additional surface active agents is not greater than about 5 percent by weight.

52. The method of enhancing recovery according to claim 50 wherein the at least one additional surface active agent comprises amphoteric surfactants, AOS dimers, chelating agents or mixtures thereof.

* * * * *